Feb. 26, 1963 T. S. SOINE 3,079,136
REUSABLE REACTION VESSEL
Filed April 26, 1961
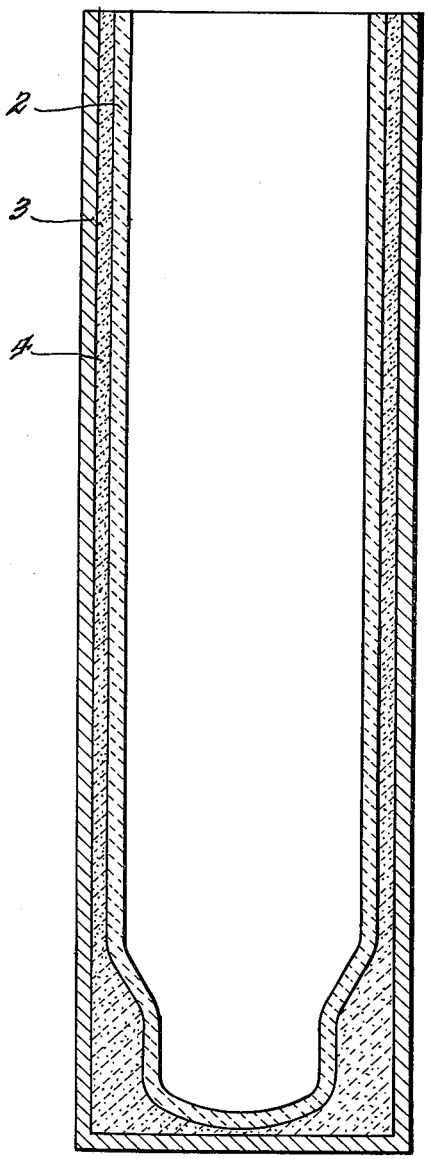
INVENTOR.
Tyler S. Soine
BY
Roland A. Anderson
Attorney

United States Patent Office 3,079,136
Patented Feb. 26, 1963

3,079,136
REUSABLE REACTION VESSEL
Tyler S. Soine, Richland, Wash., assignor to the United States of America as represented by the United States Atomic Energy Commission
Filed Apr. 26, 1961, Ser. No. 105,826
5 Claims. (Cl. 266—39)

The invention relates to a novel vessel for high temperature chemical reactions capable of being reused, and to a method of making the same, more particularly, to such a vessel for use in reductions of the compounds of heavy metals such as the actinides, by reducing metals such as calcium, magnesium, and sodium.

Surprising as the statement may seem, no reaction vessel has previously been developed for reactions of the kind mentioned, which can be reused. The severe stresses, mechanical and thermal, from such reactions cause breakage in virtually every case in spite of the fact that the vessels are made of most refractory materials available, such as magnesia. The breakage is, of itself, expensive, but more important is the hazard and expense of the cleanup which it occasions; since actinide fuels are both hazardous and economically valuable all traces that escape from the vessel, as well as those adhering to its sides, must be removed and recovered. If a reusable vessel could be provided it would therefore result in both increased safety and economy on two scores, one in that the number of vessels required would be reduced, and secondly in that the cleanups would be eliminated between batches. Fresh charges could be introduced without removing the residues from previous charges, and a thoroughgoing removal would be necessary only once in the life of each vessel, when its period of usefulness had come to an end.

Numerous attempts have been made, as might be expected, to improve the situation. One of these has been to surround the refractory vessel, or crucible, with a metal shell of somewhat greater inside dimensions than those of the outside of the crucible, and filling the space between the two with loose refractory material, preferably the same material as the material from which the crucible was made. This gives the crucible support during the chemical reaction; it may possibly delay its breakage until the reaction runs its course somewhat more completely, and when the inevitable breaking occurs it limits the spread of the contents of the crucible. Nevertheless, this does not make for a reusable vessel, with the desired advantages above outlined.

It is, accordingly, an object of the invention to provide a reusable reaction vessel capable of withstanding the stresses of repeated high temperature chemical reactions.

It is a further object to provide such a reusable reaction vessel for reductions of the compounds of heavy metals such as the oxides and salts of the actinides, by reducing metals such as calcium, magnesium and sodium.

It is a further object to provide a method of making vessels of the kind set forth in the foregoing object paragraphs.

All the foregoing objects are attained by my discovery that a refractory vessel surrounded by a metal shell and loose refractory material in the space between the vessel and the shell can be made reusable by impregnating in a certain manner the vessel and the refractory material with a salt or a mixture of salts which fuse at a higher temperature than the initiating temperature of the chemical reaction to be carried out in the vessel but below the melting points of the other materials of construction. Sintered magnesia crucibles surrounded by metal shells and with beds of loose magnesia therebetween, for example, treated with impregnating salts according to the invention, can be used for an average of 12 batches with a breakage rate of virtually zero; small sized crucibles of the same kind have lasted on the average from 18 to 20 batches.

It is essential that both the vessel and its surrounding bed be thoroughly impregnated with the fusible salt so as to make a firm unitary structure capable of withstanding the thermal shock of the reaction. In reductions of the kind above described this shock takes place soon after the initiating temperature is reached; when plutonium trichloride is reduced by calcium, for example, the initiating temperature is about 280° and the thermal shock takes place below the melting point of the impregnating salt. For this reason the impregnation must be carried out in such a way that the structure be firm, and I have found that this requisite firmness can be secured by melting the necessary quantity of impregnating salt within the crucible and then tilting and rotating it until all the salt percolates out through the shell of the crucible through its pores. Merely mixing the sand bed and salt together in the dry state and then heating them does not suffice; this neither impregnates the pores of the crucible, nor does it produce the firm structure needed within the surrounding bed.

The impregnating salt should be solid at the initiating temperature of the reaction, and preferably at the highest temperature of the exterior of the crucible during the entire reaction as well.

Reference is now made to the FIGURE which is a sectional view of a typical embodiment of the invention. 2 is a cylindrical crucible of conventional shape and construction of refractory material made coherent by some such process as sintering. Crucible 2 is preferably of magnesia sintered together so as to make the somewhat porous structure which is customary in crucibles of this general type. 3 is a surrounding metal shell, preferably of stainless steel, of cylindrical shape, with inside dimensions somewhat greater than the outside dimensions of the crucible 2. 4 is a compacted bed of uncohered refractory material, again preferably magnesia, which occupies substantially all the space between the crucible 2 and the shell 3. Both crucible 2, throughout its pores, and compacted bed 4 are impregnated with a salt or salt mixture, as will now be explained.

In carrying out the invention, any salt or salt mixture may be used which is thermally conductive in the solid state and which melts at a temperature above the initiating temperature of the reaction to be carried out and below the melting point of the other structural materials. Halides of the alkali and alkaline earth metals meet these requirements. In certain instances, it is preferable to select a salt which is also one of the reaction products since this simplifies the problem of separation by limiting the number of chemical individuals to be dealt with. On the other hand, such a selection can in certain instances have adverse effects, such as causing unwanted precipitation by exceeding the solubility product, shifting the equilibrium of the reaction in an undesired direction and the like; such adverse effects may be sufficiently important in some cases that the advantages of limiting the number of chemical individuals become outweighed. The use of mixtures, particularly eutectic mixtures, has the advantage of lowering the melting point of the salt component, and this again, may outweigh the advantage of simplicity inherent in a pure salt.

Since calcium, magnesium, and sodium are the most commonly used reducing metals, the halides of these metals are preferable in the great majority of instances, examples being $CaCl_2$, $CaF_2$, NaCl, NaF, and mixtures thereof. A mixture of 80 mole percent NaF with 20 mole percent $CaF_2$ has given good results.

The salt or salt mixtures having been selected to meet the requirements of the particular reaction, the quantity used should be sufficient to impregnate the pores of the crucible and the surrounding bed of loose refractory material without any excess.

*Example*

A hollow right cylinder of stainless steel open at one end had walls about 1/16 inch thick and measured 10 inches high and 3½ inches in outside diameter. Into this was placed a crucible of roughly the same shape made of sintered porous magnesia measuring about 9 15/16 inches high and with an outer diameter of about 3¼ inches. For convenience, the mouth of the crucible was closed with a rubber stopper and about 400 grams of magnesia sand were poured around it inside the stainless steel cylinder until the sixteenth of an inch space separating the two was completely filled by the sand.

The stopper was then removed and about 300 grams of calcium chloride were placed in the crucible. The assembly was then placed in a heating furnace having a remotely controlled manipulator, and heated to 900° C. The manipulator tilted and turned the assembly as the heating continued until all the calcium chloride left the inside of the crucible, thereby impregnating it and the magnesia sand. The assembly, now a unitary reaction vessel, was withdrawn from the heating furnace and permitted to cool. In a typical use, the vessel was charged with 700 grams of plutonium trichloride and the stoichiometric amount of metallic calcium required for its reduction and placed in a reaction funrace upon a bed of loose magnesia sand in a rectangular container. After the reaction was complete the vessel was removed from the reaction furnace and permitted to cool. The plutonium metal was found to have congealed in a button shape which was recovered by drilling the slag until the metal button became loose, and inverting the vessel.

The vessel was recharged without further decontamination and the process repeated eleven more times. During these twelve uses, the vessel showed no cracks or breaks, but at the end the inside bottom presented a sufficiently deteriorated appearance that it was deemed advisable not to reuse the vessel.

All the foregoing operations were carried out in airtight "glove boxes" isolated from the environment.

It will be understood that this invention is not to be limited to the details given herein, but that it may be modified within the scope of the appended claims.

What is claimed is:

1. A reusable reaction vessel comprising an outer metal shell, an inner container of porous coherent refractory material, and therebetween a bed of uncohered refractory material, said inner container and said bed both being impregnated by an inorganic salt which is thermally conductive in the solid state and which melts below the melting point of the construction materials of the vessel.

2. The vessel of claim 1 where the inorganic salt is a salt mixture.

3. The vessel of claim 1 where the container of porous coherent refractory material is sintered magnesia, the refractory material is magnesia sand and the inorganic salt is selected from the group consisting of alkali metal halides and alkaline earth metal halides.

4. A method of making a reusable reaction vessel comprising placing an inner container of coherent refractory material within a surrounding metal shell of slightly greater inside dimensions than the outside dimensions of the container, filling the space therebetween with uncohered refractory material, and impregnating both the inner container and the uncohered refractory material with an inorganic salt which is thermally conductive in the solid state and which melts below the melting point of the other parts of the vessel and above the initiating temperature of the reaction to be carried out in the vessel.

5. A method of making a reusable reaction vessel for the reduction of an actinide compound by a reducing metal, comprising placing an inner container of sintered magnesia within a surrounding metal shell of greater inside dimensions than the outside dimensions of the container, filling the space therebetween with magnesia sand, compacting the magnesia sand, placing within the inner container a quantity of an inorganic salt sufficient to impregnate said inner container and said magnesia sand, said inorganic salt being thermally conductive in the solid state and having a melting point lower than the construction material of the reaction vessel and higher than the initiating temperature of the said reduction, raising the ambient temperature to melt said inorganic salt, tilting and rotating the reaction vessel until the entire quantity of inorganic salt percolates through the walls of the inner container and said inner container and said magnesia sand are both thoroughly impregnated therewith.

References Cited in the file of this patent
UNITED STATES PATENTS

| | | |
|---|---|---|
| 396,992 | Eames | Jan. 29, 1889 |
| 1,982,490 | Williams et al. | Nov. 27, 1934 |
| 2,912,740 | Berry | Nov. 17, 1959 |